United States Patent
Ishiguro et al.

(10) Patent No.: US 6,205,810 B1
(45) Date of Patent: Mar. 27, 2001

(54) ABSORPTION COOLING APPARATUS

(75) Inventors: Katsusuke Ishiguro; Akira Maruyama; Hiroshi Kamiya, all of Nagoya (JP)

(73) Assignee: Paloma Industries, Limited, Nagoya (JP)

( * ) Notice: Subject to any disclaimer, the term of this patent is extended or adjusted under 35 U.S.C. 154(b) by 0 days.

(21) Appl. No.: 09/351,285

(22) Filed: Jul. 12, 1999

(30) Foreign Application Priority Data

Jul. 13, 1998 (JP) .................................................. 10-214844

(51) Int. Cl.⁷ ........................................................ F25B 15/00
(52) U.S. Cl. .................................................. 62/476; 62/486
(58) Field of Search ........................................ 62/476, 486

(56) References Cited

U.S. PATENT DOCUMENTS

| | | | |
|---|---|---|---|
| 3,491,545 | * 1/1970 | Leonard, Jr. ............................ | 62/101 |
| 3,849,232 | * 11/1974 | Kessler et al. ....................... | 159/13 A |
| 4,791,790 | 12/1988 | Tongu . | |
| 4,872,319 | 10/1989 | Tongu . | |
| 5,421,173 | * 6/1995 | Lee et al. ................................. | 62/485 |
| 5,794,456 | 8/1998 | Ishiguro et al. . | |
| 5,802,866 | * 9/1998 | Ishiguro ................................ | 62/324.2 |
| 5,842,351 | * 12/1998 | Earhart, Jr. .............................. | 62/117 |
| 5,934,086 | * 8/1999 | Abe et al. ................................ | 62/108 |

FOREIGN PATENT DOCUMENTS

| 1-134177 | 5/1989 | (JP) . |
|---|---|---|
| 10-26437 | 1/1998 | (JP) . |

* cited by examiner

Primary Examiner—William Doerrler
Assistant Examiner—Melvin Jones
(74) Attorney, Agent, or Firm—Oliff & Berridge, PLC

(57) ABSTRACT

Each of the water dispense pipes 46 in a dual pipe unit has nozzle 46a in an area starting just before the evaporating/absorbing compartment 43 and extending to its distal end. The nozzle 46a is a means by which the portion of the circulation pipe that is located upstream of the nozzle and which is exposed to elevated temperature is isolated from the evaporating/absorbing compartment filled with a low-temperature and pressure atmosphere. As a result, the streams of refrigerant water coming from the distributor 45 are suppressed by the nozzles at the distal ends of the individual water dispense pipes so that the liquid pressure becomes uniform among those distal ends, from which the refrigerant water is dispensed into the evaporating/absorbing compartment at a generally uniform pressure.

1 Claim, 3 Drawing Sheets

ABSORPTION COOLING APPARATUS

BACKGROUND OF THE INVENTION

The present invention relates to an absorption cooling apparatus that is used as an outdoor machine for an absorption air conditioning system and which cools the heat transfer medium used to activate the cooling operation of an indoor air conditioner. The invention particularly relates to an improvement of the mechanism for dispensing the liquid refrigerant.

Among the known absorption cooling apparatuses is the one that is described in the Unexamined Japanese Patent Application Publication No. Hei 1-134177 and which is applied to an absorption air conditioning system. The general layout of the cooling apparatus is shown in FIG. 3. A liquid refrigerant from a condenser 1 is forced by a pump 2 below the condenser 1 so that it is collected in a refrigerant reservoir 4 above an evaporator 3; the liquid refrigerant is dispensed on through a multiple of holes in the bottom plate of the reservoir 4 to enter evaporation compartments 6; the liquid refrigerant is evaporated on the peripheral surfaces of circulation pipes 7 penetrating the evaporation compartments 6, whereupon the heat transfer medium passing through the circulation pipes 7 is cooled by the resulting heat of vaporization.

In the absorption cooling apparatus described above, the liquid refrigerant is collected in the refrigerant reservoir 4 above the evaporator 3 and the dispense holes 5 are distributed in the bottom plate of the reservoir 4. If the evaporator 3 tilts in certain situations such as during the assembling and installation of the cooling apparatus, variations are prone to occur in the dispense of the liquid refrigerant through the holes 5 and the resulting variations in the cooling performance of the evaporating refrigerant in the evaporation compartments 6 can potentially reduce the cooling performance of the cooling apparatus. As a further problem, although the atmosphere in the evaporation compartments 6 is at low temperature and pressure, the passageway of the liquid refrigerant has high temperature due to contact with outdoor air and, hence, the circulating liquid refrigerant tends to evaporate before entering the evaporation compartments 6, potentially leading to a lower efficiency in the supply of the liquid refrigerant.

The present invention has been accomplished under these circumstances and has as an object providing an absorption cooling apparatus which not only assures uniform dispensing of a liquid refrigerant within evaporation compartments but also prevents its evaporation before it enters the evaporation compartments, whereby the cooling performance of the cooling apparatus is enhanced.

SUMMARY OF THE INVENTION

This object of the invention can be attained by an absorption cooling apparatus comprising a plurality of evaporation compartments provided around a part of the circulation pipes through which a heat transfer medium circulates, a condenser for condensing the vapor of a refrigerant to a liquid refrigerant, a distributor for collecting the liquid refrigerant from the condenser, and a plurality of refrigerant dispense pipes which are connected to the distributor and which have distal end projecting into the evaporation compartments to dispense the outer surfaces of the circulation pipes with the liquid refrigerant collected in the distributor, so that the heat transfer medium circulating through the circulation pipes is cooled by the evaporation of the liquid refrigerant, wherein a nozzle is provided at the distal end of each of the refrigerant dispense pipes.

Since the distal end of each refrigerant dispense pipe is constricted, the streams of liquid refrigerant coming from the distributor are suppressed by the nozzles at the distal ends of the refrigerant dispense pipes so that the liquid pressure becomes uniform among those distal ends, from which the liquid refrigerant is dispensed into the evaporation compartments at a generally uniform pressure. Therefore, even if the cooling apparatus tilts during assembling or installation so that the quantity of the liquid refrigerant flowing out of the distributor varies from one dispense pipe to another, the liquid refrigerant can be dispensed from the distal ends of the individual dispense pipes onto the outer surfaces of the circulation pipes at a generally uniform pressure. As a result, the heat transfer medium passing through the circulation pipes is cooled uniformly by the evaporating liquid refrigerant.

The constricted distal ends of the refrigerant dispense pipes have an added advantage in that the liquid refrigerant within the dispense pipes exposed to elevated temperature and the liquid refrigerant at the sites upstream thereof are effectively isolated from the interior of the evaporation compartments located downstream that are filled with a low-temperature and pressure atmosphere. As a result, the evaporation of the liquid refrigerant is suppressed not only within the dispense pipes but also at the sites-upstream thereof.

DETAILED DESCRIPTION OF THE PREFERRED EMBODIMENTS

Figure 1:
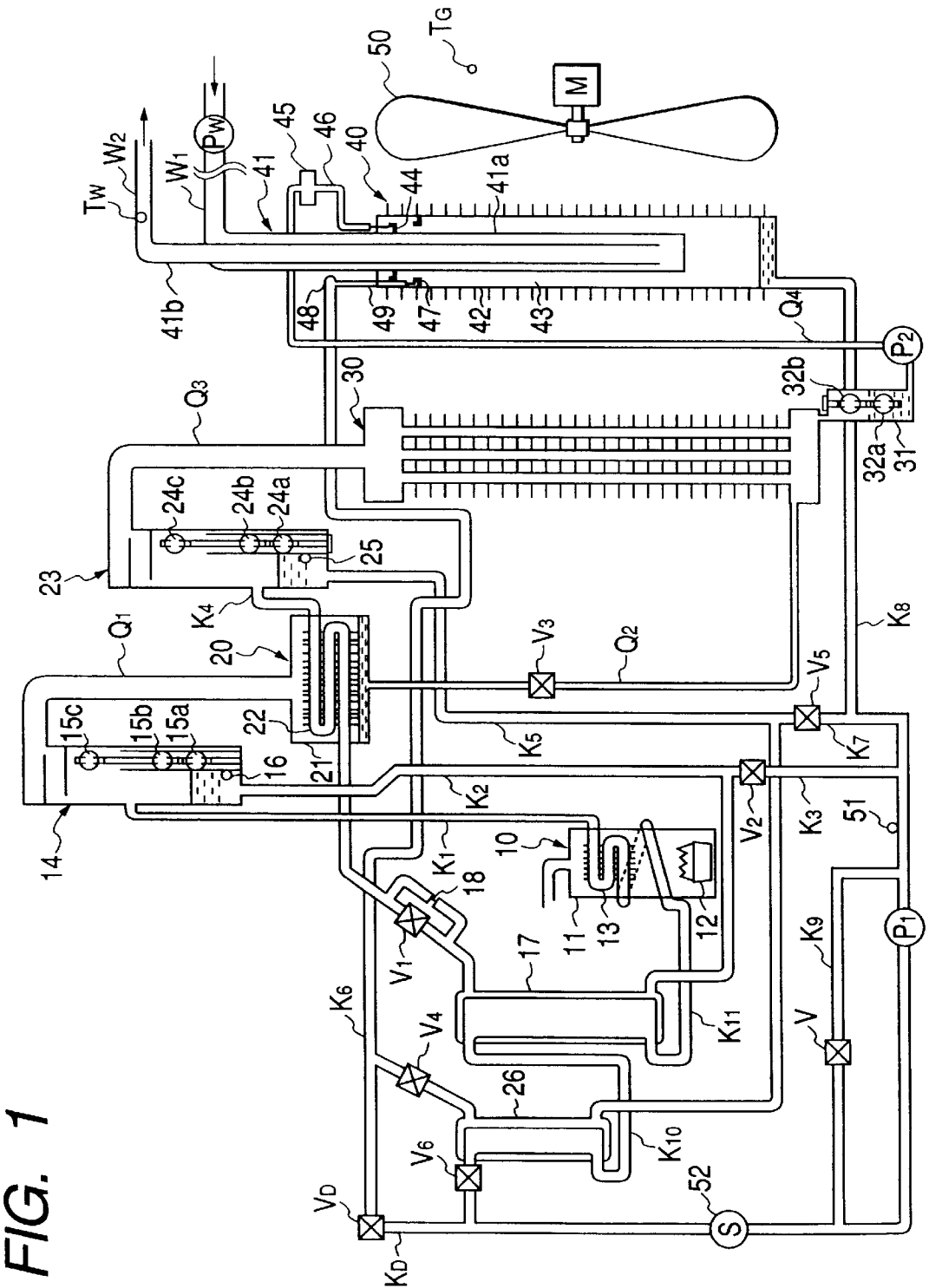
FIG. 1 is a diagrammatic representation of an absorption cooling apparatus according to an embodiment of the present invention.

We now describe an embodiment of the invention with reference to accompanying drawings, among which FIG. 1 shows the general layout of an absorption cooling apparatus according to the embodiment which cools a heat transfer medium (which is cold water in the case under consideration and hereunder referred to as "cold water") used for cooling purposes in an indoor cooler.

The absorption cooling apparatus shown in FIG. 1 has the following basic elements: a high-temperature generator 10 which uses the heat of combustion from a burner 12 to heat a solution of lithium bromide (which is hereunder referred to as either a low-concentration solution, a medium-concentration solution or a high-concentration solution depending on the concentration of lithium bromide), or a low-concentration absorbing liquid; a high-temperature separator 14 for high-temperature generator (which is hereunder referred to simply as a high-temperature separator) by which the low-concentration solution heated in the high-temperature generator 10 is separated into steam and a medium-concentration solution; a low-temperature generator 20 by which the medium-concentration solution being sent form the high-temperature separator 14 via a high-temperature heat exchanger 17 is reheated with the steam sent from the high-temperature separator 14; a low-temperature separator 23 for low-temperature generator (which is hereunder referred to simply as a low-temperature separator) by which the medium-concentration solution heated in the low-temperature generator 20 is separated into steam and a high-concentration solution; a condenser 30 by which the steam being sent from the low-temperature separator 23 is cooled to liquefy; a dual pipe unit 40 which cools cold water for cooling purposes by evaporating the refrigerant water being sent from the condenser 30 and which also allows the resulting steam to be absorbed by the high-concentration solution being sent from the low-temperature separator 23 via a low-temperature heat exchanger 26; a cooling fan 50 for cooling the dual pipe unit 40 and the condenser 30; and a solution pump P1 with which the low-concentration solution from the dual pipe unit 40 is sent to the high-temperature generator 10 after its temperature has been raised by heat exchange in the low-temperature heat exchanger 26 and the high-temperature heat exchanger 17. The individual elements are interconnected by pipes. For more specific information about the individual elements, see below.

The high-temperature generator 10 has a fin-and-tube heat exchanger 13 (which is hereunder referred to as a heat exchanger) that is contained in a housing 11 and heated with the burner 12 so that the solution of lithium bromide flowing through the tubes is efficiently heated. The high-temperature separator 14 is connected to the high-temperature generator 10 via a circulation pipe K1 and it has the following three float switches: a lower limit float switch 15a for detecting the lower limit of the liquid level; an upper limit float switch 15b for detecting the upper limit of the liquid level; and a stop float switch 15c that is provided above the upper limit float switch 15b for detecting the critical liquid level. When the stop float switch 15c turns on, the burner 12 stops heating and the cooling apparatus shuts down. Provided within the high-temperature separator 14 is a liquid temperature sensor 16 for detecting the temperature of the medium-concentration solution contained in the separator 14.

A circulation pipe K2 for circulating the solution from the high-temperature separator 14 is connected via the high-temperature heat exchanger 17 to a fin-and-tube heat exchanger 22 to be described below (which is hereunder referred to as a heat exchanger) that is provided in the low-temperature generator 20. The high-temperature heat exchanger 17 performs heat exchange between the hot medium-concentration solution from the high-temperature separator 14 that flows externally and the cold low-concentration solution being supplied from the solution pump P1 that flows internally. An orifice 18 and a float-associated valve V1 are provided parallel to each other on the circulation pipe K2 between the high-temperature heat exchanger 17 and the low-temperature generator 20. The pressure of the solution passing through the orifice 18 is reduced to create a smaller pressure difference across it so that the liquid level in the high-temperature separator 14 is held at a sufficient height to provide a liquid seal. The float-associated valve V1 is a solenoid valve that is operatively associated with the float switches 15a and 15b in the high-temperature separator 14 such that it is closed when the lower limit float switch 15a turns off by detecting the level of the internal medium-concentration solution having dropped to the lower limit whereas it is opened when the upper limit float switch 15b turns on by detecting the liquid level having reached to the upper limit.

Provided on the circulation pipe K2 at a site upstream of the high-temperature heat exchanger 17 is an overflow pipe K3 that branches from the circulation pipe K2 to combine with and connect to a circulation pipe K8 to be described below (the term "upstream" is hereunder used to describe the side from which the solution flows and the term "downstream" is used to describe the side to which the solution flows). The overflow pipe K3 is provided with an overflow valve V2 that opens or closes the conduit; when the overflow valve V2 opens, the solution will no longer overflow the high-temperature separator 14.

The low-temperature generator 20 has a fin-and-tube heat exchanger 22 contained in a housing 21, to which is connected a pipe Q1 serving as a path for the steam from the high-temperature separator 14. The solution of lithium bromide flowing through the heat exchanger 22 is heated with the steam supplied from the high-temperature separator 14 via the pipe Q1. Connected to the bottom of the housing 21 is a pipe Q2 through which the water collecting within the housing 21 is sent to the bottom of the condenser 30 and which is provided with a valve V3 that works as an orifice to create a pressure difference between the low-temperature generator 20 and the condenser 30.

The low-temperature separator 23 is connected via a circulation pipe K4 to a site downstream of the heat exchanger 22. The low-temperature separator 23 is also provided with a lower limit float switch 24a, an upper limit float switch 24b and a stop float switch 24c. These float switches are all used to control the liquid level in the low-temperature separator 23. The low-temperature separator 23 is provided with a liquid temperature sensor 25 for detecting the temperature of the high-concentration solution contained therein. The solution from the low-temperature separator 23 is circulated through a circulation pipe K5 and the low-temperature heat exchanger 26 and a solenoid valve V4 that opens or closes the conduit are provided in that order on the circulation pipe K5, which combines with a circulation pipe K6 at a site downstream of the solenoid valve V4 so that it eventually connects to a distributor 48 to be described below. The low-temperature heat exchanger 26 performs heat exchange between the hot high-concentration solution from the low-temperature separator 23 that flows externally and the cold low-concentration solution being supplied from the solution pump P1 that flows internally.

Provided on the circulation pipe K5 at a site upstream of the low-temperature heat exchanger 26 is an overflow pipe K7 that branches from the circulation pipe K5 to combine with and connect to the circulation pipe K8 to be described below. The overflow pipe K7 is provided with an overflow value V5 that opens or closes the conduit; when the overflow valve V5 opens, the solution will no longer overflow the low-temperature separator 23.

The condenser 30 is formed of a plurality of vertically erected cylindrical pipes that extend through a plurality of fins. The top end of the condenser 30 is connected via a pipe Q3 to the low-temperature separator 23 so that the steam being sent from the latter is sufficiently cooled by the wind created with the cooling fan 50 to be condensed to water. The water that has liquefied in the low-temperature generator 20 flows into the condenser 30 via the pipe Q2 connected to the bottom and combines with the water condensed in the condenser 30. A refrigerant tank 31 is connected to the bottom of the condenser 30 so that the refrigerant water condensed in the condenser 30 and the low-temperature generator 20 flows into the tank for temporary storage. Provided within the refrigerant tank 31 are a lower limit float switch 32a for detecting the lower limit of the liquid level and an upper limit float switch 32b for detecting the upper limit of the liquid level. A pipe Q4 extends from the bottom of the refrigerant tank 31 and connects to a distributor 45 to be described below. A refrigerant pump P2 is provided on the pipe Q4 and it starts to run and supplies the liquid refrigerant when the upper limit float switch 32b turns on by detecting the liquid level of the tank 31 having reached the upper limit and stops running when the lower limit float switch 32a turns off by detecting the liquid level having dropped to the lower limit. The refrigerant pump P2 not only prevents the entrance of gases into the pipe Q4 but also controls the concentration of the absorbing liquid in the overall system.

The dual pipe unit 40 is erected vertically and comprises a cold water pipe 41 serving as a passageway of the cold water that is to be used in an indoor cooler (not shown) and surrounded by a coaxial outer pipe 42. The cold water pipe 41 is of a dual structure consisting of the following two parts: an evaporating pipe portion 41a that is connected integrally to an inflow pipe W1 for admitting incoming cold water from the indoor cooler and which is sealed at the bottom; and an inner pipe portion 41b that is coaxially provided within the evaporating pipe portion 41a. The bottom of the inner pipe portion 41b is open near the bottom of the evaporating pipe portion 41a whereas its top penetrating the top of the evaporating pipe portion 41a to project into the latter is fixed thereto in a liquid-tight manner, with the foremost end of the inner pipe portion 41b being connected integrally to an outflow pipe W2 for letting the cold water flow to the indoor cooler. A cold water circulating pump $P_w$ is provided on the inflow pipe W1 and the outflow pipe W2 is provided with a water temperature sensor $T_w$ for detecting the temperature of the cold water circulating through the pipe.

The outer pipe 42 is sealed at both top and bottom ends and has a multiple of fins 42a provided coaxially on the periphery. The cold water pipe 41 penetrates the top of the outer pipe 42 but it is fixed to the latter in a liquid-tight manner, with its bottom end being spaced from the bottom end of the outer pipe 42 by a specified distance. This arrangement forms the dual pipe unit 40 having an evaporating/absorbing compartment 43 that is provided between the evaporating pipe portion 41a and the outer pipe 42 and which consists of an evaporation chamber where the refrigerant water is evaporated and an absorption chamber where the evaporating refrigerant is absorbed.

Figure 2:
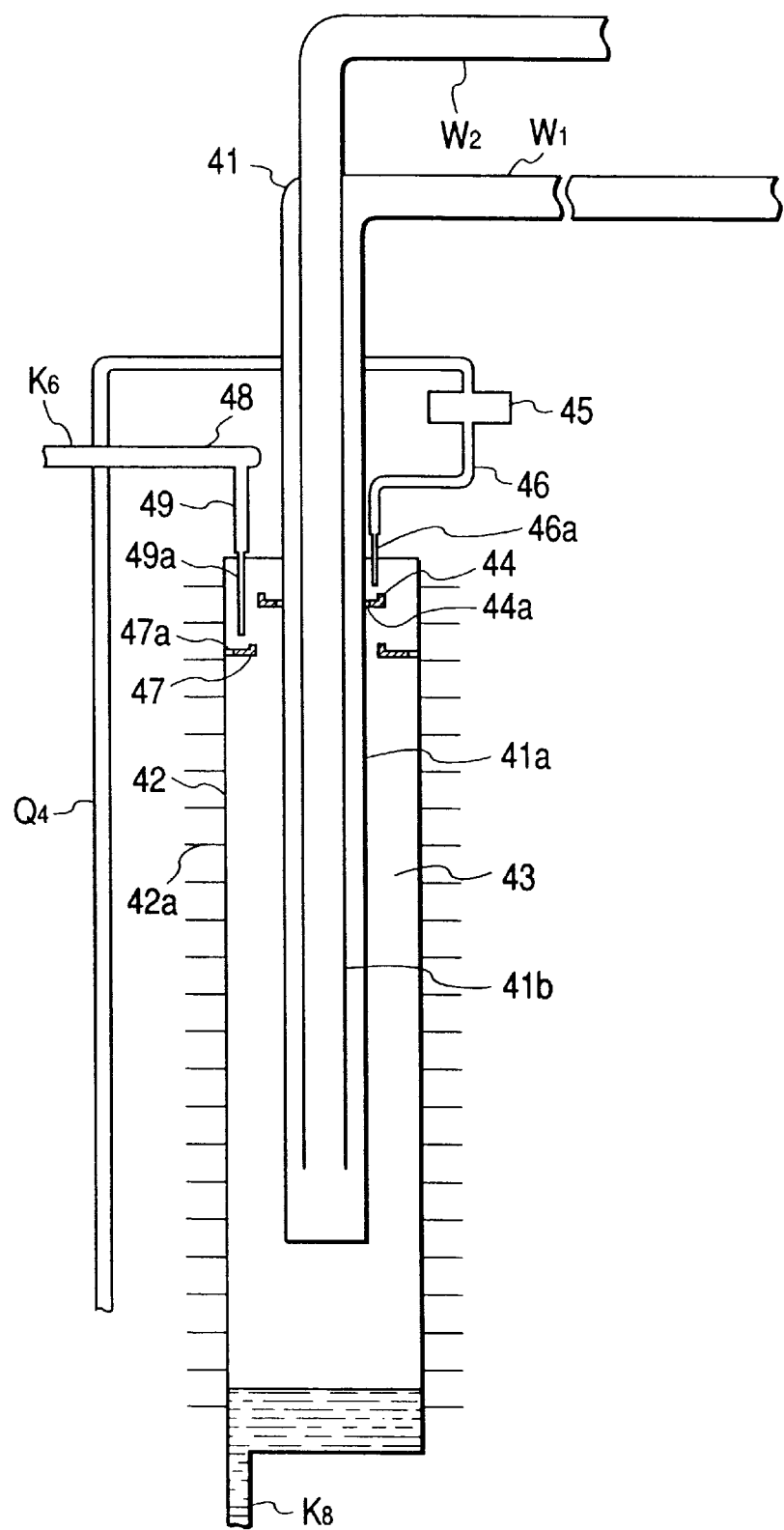
FIG. 2 is a sectional view showing details of the dual pipe unit in the absorption cooling apparatus.
Figure 3:
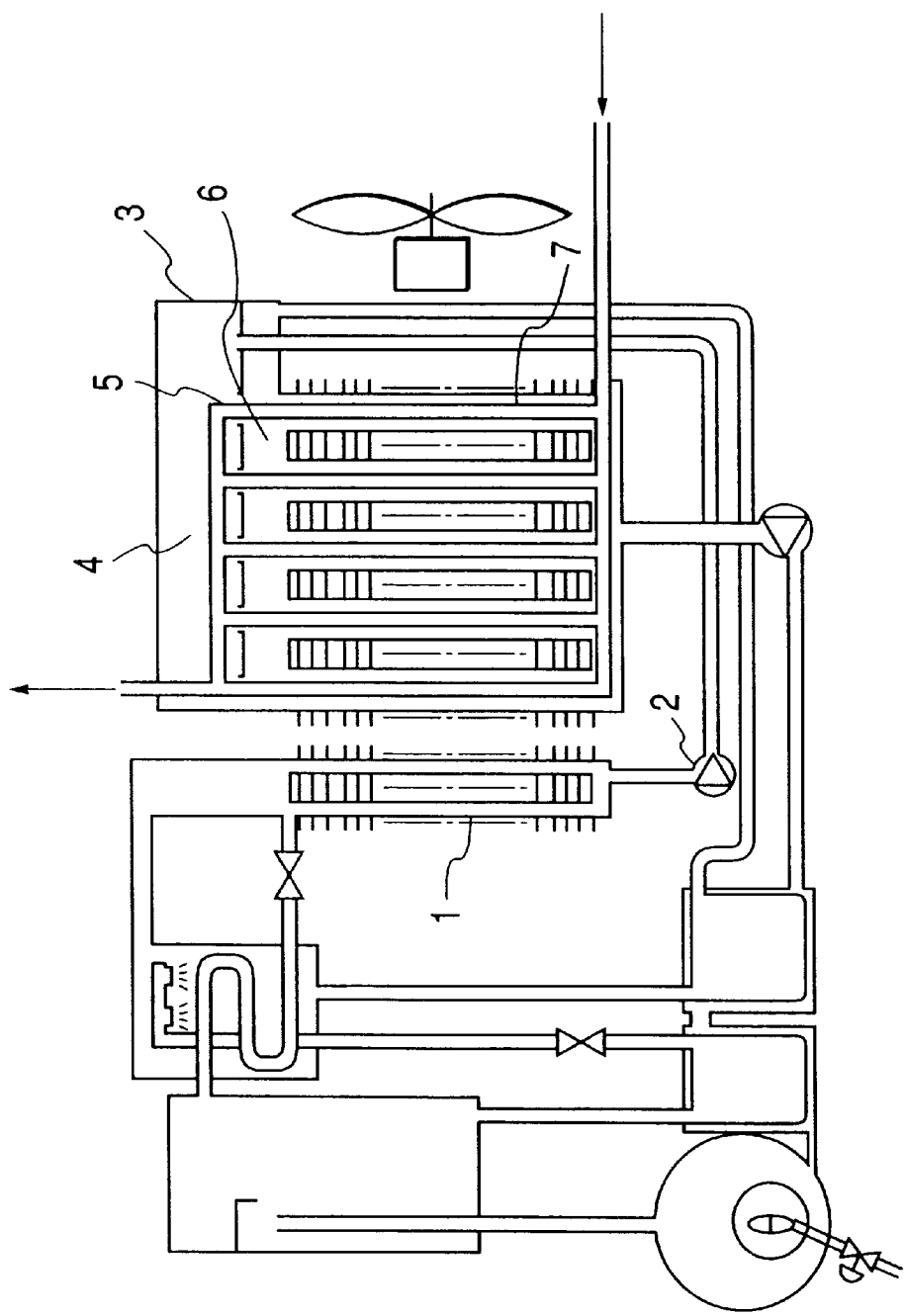
FIG. 3 is a diagrammatic representation of a prior art absorption cooling apparatus.

As shown in FIGS. 1 and 2, the evaporating pipe portion 41a of the cold water pipe 41 has an annular water-receiving tray 44 provided coaxially within the evaporating/absorbing compartment 43 near its top end in such a manner that the peripheral surface of the evaporating pipe portion 41a is surrounded with the tray. A plurality of holes 44a through which refrigerant water is dispensed onto the outer surface of the evaporating pipe portion 41a are provided in the tray 44 around its opening near the inner edge. Provided above the water-receiving tray 44 are water dispense pipes 46 that penetrate the top of the outer pipe 42 to project into the evaporating/absorbing compartment 43 and which are distributed via a distributor 45 provided at the tip of the pipe Q4 extending from the refrigerant tank 31.

Each of the water dispense pipes 46 has a nozzle 46a in an area starting just before the evaporating/absorbing compartment 43 and extending to its distal end. The nozzle 46a is a means by which that portion of the circulation pipe which is upstream of the nozzle 56a and exposed to elevated temperature is isolated from the interior of the evaporating/absorbing compartment 43 filled with a low-temperature and pressure atmosphere. The evaporating pipe portion 41a is a fluted pipe having grooves formed in the peripheral surface in both vertical and horizontal directions. This arrangement provides ease for water permeation on the peripheral surface of the evaporating pipe portion 41a so that it will drip at a slower speed to spread more easily to ensure efficient evaporation of the water flowing down the peripheral surface of the evaporating pipe portion 41a.

An annular solution-receiving tray 47 is provided coaxially on the inner peripheral surface of the outer pipe 42 in a position slightly below the water-receiving tray 44 and a plurality of holes 47a through which the solution is dispensed onto the inner surface of the outer pipe 42 are provided in the tray around its opening near the outer edge. Provided above the solution-receiving tray 47 are solution dispense pipes 49 that penetrate the top of the outer pipe 42 to project into the evaporating/absorbing compartment 43 and which are distributed via a distributor provided at the tip of an extension of the circulation pipe K6.

Again, each of the solution dispense pipes 49 has a nozzle 49a in an area starting just before the evaporating/absorbing compartment 43 and extending to its distal end. The nozzle 49a is a means by which that portion of the circulation pipe K6 which is upstream of the nozzle 49a and exposed to elevated temperature is isolated from the evaporating/absorbing compartment 43 filled with a low-temperature and pressure atmosphere. The inner peripheral surface of the outer pipe 42 is also roughened by shot blasting or other suitable technique so that the solution will easily permeate the inner peripheral surface to drip at a slower speed while spreading easily. Instead of being roughened, the inner peripheral surface of the outer pipe 42 may be fitted with a lath or other types of screen. Although not shown, there are as many dual pipe units 40 as the water dispense pipes 46 and the solution dispense pipes 49 and they are provided parallel to one another.

Extending from the bottom wall of the dual pipe unit 49 is a circulation pipe K8 that forms a solution circulating path for supplying the low-concentration solution to the high-temperature generator 10, and the pump P1 is provided midway the circulation pipe K8. The aforementioned antiflow pipes K7 and K3 are sequentially combined with and connected to the circulation pipe K8 in positions upstream of the solution pump P1. The circulation pipe K8 has a bypass pipe K9 that bypasses the solution pump P1; a bypass valve V is provided on the bypass pipe K9 to provide for adjustment of the flow of the solution. The circulation pipe K8 is also furnished with a liquid temperature sensor 51 for detecting the temperature of the solution and this is used to control both normal operation and diluting operation of the cooling apparatus. A flow sensor 52 is provided on the circulation pipe K8 in a position downstream of the solution pump P1 so as to control the ignition of the burner 12, the amount of gas supply to the burner 12 (by adjusting the flow of the low-concentration solution) and so forth. A solenoid valve V6 for opening or closing the conduit is provided near the entrance of the low-temperature heat exchanger 26. The inner pipe of the low-temperature heat exchanger 26 and that of the high-temperature heat exchanger 17 are connected by a circulation pipe K10 and the inner pipe of the high-temperature heat exchanger 17 in turn is connected to the heat exchanger 13 in the high-temperature generator 10 by a circulation pipe K11.

Provided on the circulation pipe K8 in a position slightly upstream of the solenoid valve V6 is a diluent circulating pipe KD that branches from the circulation pipe K8 to combine with the circulation pipe K6. The diluent circulating pipe KD is fitted with a diluting valve VD that opens or closes the conduit. The diluent circulating pipe KD is so designed that when the diluting pipe VD opens, the circulation pipe K8 fitted with the solution pump P1 is directly connected to the absorber A via the circulation pipe K6; hence, the pipe KD is useful in an operation for diluting the high-concentration solution resulting from normal operation.

The actions of the absorption cooling apparatus are electrically controlled by means of a control unit (not shown) that is composed of a microcomputer typically consisting of a CPU, ROM, RAM, timer and I/O. To be more specific, in response to the inputs from the aforementioned lower limit float switch 15a, upper limit float switch 15b, stop float switch 15c, liquid temperature sensor 16, liquid temperature sensor 25, lower limit float switch 32a, upper limit float switch 32b, liquid temperature sensor 51 and flow sensor 52, as well as an ambient temperature sensor TG for detecting the temperature of outdoor air, a water temperature sensor TW for detecting the temperature of water and a power switch SW, the control unit controls the aforementioned float-associated valve V1, overflow valves V2 and V5, solenoid valves V4 and V6, diluting valve VD, solution pump P1, refrigerant pump P2, cold water circulating pump PW, burner 12 and cooling fan 50.

Having described the construction of the absorption cooling apparatus according to one embodiment, we now discuss its operation.

When the indoor cooler switch SW is turned on, the cold water circulating pump PW starts to supply cold water to the dual pipe unit 40. Note that the cooling apparatus does not work if the temperature of the cold water is below a preset level (which is typically 7° C.). If the temperature of the cold water exceeds the preset level, solenoid valves V4 and V6 and overflow valve V2 are opened and solution pump P1 starts to run. If the flow sensor 52 detects the required flow of the solution, the burner 12 starts combustion and the low-concentration solution is heated. The cooling fan 50 also starts to run. As a result, the lithium bromide solution of low concentration being heated in the high-temperature generator 10 gives off the vapor of water so that it is separated into steam and a medium-concentration solution in the high-temperature separator 14. The solution- has its temperature raised rapidly as it circulates through a short path connecting circulation pipes K1, K2, overflow pipe K3, and circulation pipes K8, K10 and K11.

When the liquid temperature sensor 16 detects that the temperature of the solution in the high-temperature separator 14 has exceeded a preset level (which is typically 70° C.), the overflow valve V2 is closed and the overflow valve V5 is opened. As a result, the medium-concentration solution flowing out of the high-temperature separator 14 is cooled in the high-temperature heat exchanger 17, then heated in the heat exchanger 22 in the low-temperature generator 20 and eventually separated into steam and a high-concentration solution in the low-temperature separator 23. The solution has its temperature raised rapidly as it flows through a short path connecting circulation pipes K1, K2, K4, K5, overflow pipe K7, and circulation pipes K8, K10 and K11. In the case under consideration, the lower limit float switches 15a and 15b combine with the float-associated valve V1 to control the liquid level in the high-temperature separator 14, thereby preventing the mixing of steam with the solution.

When the liquid temperature sensor 25 detects that the liquid temperature in the low-temperature separator 23 has exceeded a preset level (which is typically 70° C.), the overflow valve V5 is closed. Then, the high-concentration solution from the low-temperature separator 23 is cooled as it passes through the low-temperature heat exchanger 26; thereafter, the solution flows through the circulation pipes K5 and K6, is distributed by the distributor 48 and dripped on the solution receiving tray 47 from the solution dispense pipes 49 so that it passes through the dispense holes to flow down the inner surface of the outer pipe 42. As a result, the heat generated when the steam serving as the heat transfer medium is absorbed by the high-concentration solution is efficiently removed by means of the cooling fan 50.

Each of the solution dispense pipes 49 has the nozzle 49a in the distal end portion, which contributes to ensure that the portion of the circulation pipe K6 which is located upstream of the nozzle 49a and exposed to elevated temperature is isolated from the evaporating/absorbing compartment 43 filled with a low-temperature and pressure atmosphere. As a result, the streams of high-concentration solution from the distributor 48 are suppressed by the nozzles 49a at the distal ends of the individual solution pipes so that the liquid pressure becomes uniform among those distal ends, from which the solution is dispensed into the evaporating/absorbing compartment 43 at a generally uniform pressure. Consequently, even if the cooling apparatus tilts or undergoes some other phenomenon so that the quantity of the high-concentration solution flowing out of the distributor 48 varies from one dispense pipe to another, the high-concentration solution can be dispensed from the distal ends of the individual dispense pipes 49 onto the inner surface of the outer pipe 42 in a substantially uniform manner.

The steam flowing through the pipe Q3 from the low-temperature separator 23 is condensed to liquefy in the condenser 30 and, after passing through the refrigerant tank 31, the resulting water is forced by the refrigerant pump P2 to be supplied to the distributor 45. The refrigerant water distributed by the distributor 45 is dripped on the water receiving tray 44 from the water dispense pipes 46 so that it passes through the dispense holes 44a to flow down the outer surface of the evaporating pipe portion 41a. Since the interior of the evaporating/absorbing compartment 43 is held at reduced pressure, the dripping refrigerant water evaporates and the resulting heat of vaporization cools the evaporating pipe portion 41a so that the cold water flowing into the evaporating pipe portion 41a is cooled and flows through the inner pipe portion 41b to return to the indoor cooler. The returned cold water allows the indoor cooler to run in a cooling mode.

In the case under consideration, each of the water dispense pipes 46 has the nozzle 46a in an area starting just before the evaporating/absorbing compartment 43 and extending to its distal end portion, which contributes to ensure that the portion of the circulation pipe that is upstream of the nozzle 46a and exposed to elevated temperature is isolated from the evaporating/absorbing compartment 43 filled with a low-temperature and pressure atmosphere. As a result, the streams of refrigerant water coming from the distributor 45 are suppressed by the nozzles 46a at the distal ends of the individual water dispense pipes 46 so that the liquid pressure becomes uniform among those distal ends, from which the refrigerant water is dispensed into the evaporating/absorbing compartment 43 at a generally uniform pressure. Consequently, even if the cooling apparatus tilts or undergoes some other phenomenon so that the quantity of the water flowing out of the distributor 45 varies from one water dispense pipe to another, the refrigerant water can be dispensed from the distal ends of the individual water dispense pipes onto the outer surface of the evaporating pipe portion 41a in a substantially uniform manner, thus ensuring that the cold water passing through the evaporating pipe portion 41a can be cooled uniformly by the evaporating refrigerant water. The nozzles 46a which are constricted at the distal ends of the water dispense pipes 46 have an added advantage in that the refrigerant water within the dispense pipes 46 and the refrigerant water at the sites upstream thereof including the distributor 45 are effectively isolated from the interior of the evaporating/absorbing compartment 43 located downstream which is filled with a low-temperature and pressure atmosphere. As a result, the evaporation of the refrigerant water is suppressed not only within the dispense pipes 46 but also at the sites upstream thereof.

The evaporating water is absorbed by the high-concentration solution flowing down the inner surface of the outer pipe 42, whereupon the high-concentration solution is diluted to a lower concentration and discharged from the bottom of the outer pipe 42 into the circulation pipe K8. These actions are performed in succession so that the cold water circulating through the cold water pipe 41 is cooled efficiently to enable the indoor cooler to keep running, in a cooling mode.

As described on the foregoing pages, the absorption cooling apparatus according to the embodiment under consideration has the nozzle 46a in the distal end portion of each water dispense pipe 46 and the refrigerant water is dispensed onto the outer surface of the evaporating pipe portion 41a in a substantially uniform manner so that the cold water passing through the evaporating pipe portion 41a can be cooled uniformly by the evaporating refrigerant water while the evaporation of the refrigerant water is suppressed not only within the dispense pipes 46 but also at the sites upstream thereof. As a result, the evaporation of the refrigerant water within the evaporating/absorbing compartment 43 proceeds uniformly and efficiently to ensure that the cooling apparatus exhibits its cooling performance at high efficiency. In addition, each solution dispense pipe 49 has the nozzle 49a in its distal end portion, so the high-concentration solution is dispensed almost uniformly from the distal ends of the individual dispense pipes 49 onto the inner surface of the outer pipe 42, thus assuring efficient absorption of the evaporating refrigerant water.

In the embodiment described above, not only the water dispense pipes 46 but also the solution dispense pipes 49 have nozzles (indicated by 49a). It should, however, be noted that the need to be constricted in the solution dispense pipes 49 is not as great as in the case of the water dispense pipes 46 and, depending on the case, the nozzles 49a may be omitted. It should also be noted that the embodiment described above is not the sole design of the absorption cooling apparatus of the present invention and various modifications are possible without departing from the spirit and scope of the invention, as exemplified by use of sensors other than float switches for liquid level detection, omission of the low-temperature generator and the low-temperature separator, changing the construction of the dual pipe unit, and separating the evaporator from the absorber.

According to the present invention, the liquid refrigerant is dispensed onto the outer surfaces of circulation pipes in a substantially uniform manner so that the heat transfer medium passing through the circulation pipes can be cooled uniformly by the evaporating liquid refrigerant. In addition, the evaporation of the liquid refrigerant is suppressed not only within the refrigerant dispense pipes but also at the sites upstream thereof, so that the refrigerant is evaporated within the evaporating compartments uniformly and efficiently to ensure that the cooling apparatus exhibits its cooling performance at high efficiency.

What is claimed is:

1. An absorption cooling apparatus, comprising:
   a plurality of evaporation compartments provided around a part of an outer peripheral portion of circulation pipes through which a heat transfer medium circulates;
   a condenser for condensing the vapor of a refrigerant to a liquid refrigerant;
   and a plurality of refrigerant dispense pipes which are connected to a distributor and which have a distal end projecting into said evaporation compartments to dispense the liquid refrigerant collected in said distributor onto an outer surface of said circulation pipes;
   so that the heat transfer medium circulating through said circulation pipes is cooled by the evaporation of said liquid refrigerant, wherein each of said refrigerant dispensing pipes is constricted at the distal end.

* * * * *